US008256461B1

(12) United States Patent
Sutton

(10) Patent No.: US 8,256,461 B1
(45) Date of Patent: Sep. 4, 2012

(54) DISTRIBUTION VALVE AND CAM MECHANISM

(75) Inventor: S. Jepson Sutton, Phoenix, AZ (US)

(73) Assignee: Aspen Research, Ltd, Phoenix, AZ (US)

( * ) Notice: Subject to any disclaimer, the term of this patent is extended or adjusted under 35 U.S.C. 154(b) by 279 days.

(21) Appl. No.: 12/657,882

(22) Filed: Jan. 29, 2010

Related U.S. Application Data

(60) Provisional application No. 61/148,459, filed on Jan. 30, 2009.

(51) Int. Cl.
*F16K 11/074* (2006.01)

(52) U.S. Cl. ............... 137/625.11; 137/119.07; 251/251; 123/90.6

(58) Field of Classification Search ............. 137/625.11, 137/625.12, 625.13, 119.07; 251/251, 252, 251/254, 255, 205, 208, 262, 263; 123/90.6
See application file for complete search history.

(56) References Cited

U.S. PATENT DOCUMENTS

| | | | |
|---|---|---|---|
| 3,405,733 A * | 10/1968 | Hansen | 137/624.14 |
| 3,913,455 A * | 10/1975 | Green et al. | 91/492 |
| 4,313,455 A * | 2/1982 | Pitman | 137/119.07 |
| 4,523,606 A | 6/1985 | Gould et al. | |
| 4,570,663 A | 2/1986 | Gould et al. | |
| 4,592,379 A * | 6/1986 | Goettl | 137/119.07 |
| 4,592,737 A * | 6/1986 | Dhont | 474/19 |
| 4,817,656 A * | 4/1989 | Gould | 137/2 |
| 5,309,872 A * | 5/1994 | Filippi et al. | 123/90.15 |
| 6,189,556 B1 | 2/2001 | Blake et al. | |
| 6,311,728 B1 * | 11/2001 | Goettl et al. | 137/627 |
| 6,325,087 B1 | 12/2001 | Tarr | |
| 6,379,274 B1 * | 4/2002 | Robert | 474/19 |
| 6,386,232 B2 * | 5/2002 | Serrano Sanchez et al. | 137/624.14 |
| 6,539,967 B2 | 4/2003 | Tarr | |
| 7,465,244 B2 * | 12/2008 | Jonckheere et al. | 474/23 |
| 2009/0211641 A1 * | 8/2009 | Tipotsch | 137/1 |

* cited by examiner

*Primary Examiner* — Eric Keasel
*Assistant Examiner* — Minh Le

(57) ABSTRACT

An improved multi-port water distribution valve is disclosed together with the improved cam mechanism that significantly enhances the efficiency and effectiveness of the valve when used to distribute water to multiple sets of pop-up cleaning heads incorporated into the in-floor cleaning system of a swimming pool. Two forms of prior art distribution valves are disclosed as is the improved cam mechanism that, when used to replace the prior art cam in these devices, significantly improves their performance. Comparative data is provided demonstrating the results achieved with two different prior art valves operated with and without the improved cam. Embodiments of the invention suitable for use in existing six-port and five-port distribution valves are disclosed.

7 Claims, 9 Drawing Sheets

| Cleaning Time at Peak Pressure ||||
| Cleaning Zone | Prior Art Cam: Duration (Sec.) | Invention Cam: Duration (Sec.) | Improvement Over Prior Art (%) |
| --- | --- | --- | --- |
| 1 | 8 | 36 | 350 |
| 2 | 12 | 40 | 230 |
| 3 | 8 | 37 | 360 |
| 4 | 10 | 35 | 250 |
| 5 | 10 | 36 | 250 |
| 6 | 8 | 30 | 275 |
| Average | 9.3 | 35.6 | 280 |

| Orifice Diameter | Effective Cleaning Radius || Effective Cleaning Area |||
| --- | --- | --- | --- | --- | --- |
|  | Prior Art | Invention | Prior Art | Invention | Increase (%) |
| 7/16" | 4.83 | 6.42 | 73.3 | 129.4 | 76.7 |
| 1/2" | 5.16 | 6.66 | 83.6 | 139.3 | 66.6 |
| 9/16" | 6.42 | 7.33 | 129.4 | 168.7 | 30.4 |

DISTRIBUTION VALVE AND CAM MECHANISM

BACKGROUND OF THE INVENTION

This application is related to and claims priority to a provisional application entitled Distribution Valve and Method, filed Jan. 30, 2009 and assigned Ser. No. 61/148,459.

The invention relates to improved distribution valves, particularly multi-port valves for distributing water from the high-pressure side of a swimming pool pump to various groups of cleaning heads which emit jets of water along the floor and inner surfaces of a swimming pool.

The prior art includes a number of multi-port valves for use in sequentially distributing water to various groups of cleaning heads imbedded in the bottom and side walls of a swimming pool. These include the distribution valves disclosed in the following patents: U.S. Pat. No. 4,523,606 by Gould et al., issued Jun. 18, 1985, entitled "Distribution Valve"; U.S. Pat. No. 4,570,663 by Gould et al., issued Feb. 18, 1986, entitled "Distribution Valve With Dual Cams To Prevent Uncontrolled Excursions Of Valve Balls"; 6,189,556 by Blake et al., issued Feb. 20, 2001, entitled "Low Profile, Low Resistance Distribution Valve and Method for Swimming Pools; U.S. Pat. No. 6,325,087 by William C. Tarr, issued Dec. 4, 2001, entitled "Distribution Valve And Method"; and U.S. Pat. No. 6,539,967 by William C. Tarr, issued Apr. 1, 2003, entitled "Distribution Valve And Method". Each of these prior patents is incorporated herein by reference. Each of the distribution valves disclosed in the referenced patents includes an impeller-driven gear reduction mechanism and a plurality of outlet valves controlled in response to the gear reduction mechanism.

The most recent technology, represented by U.S. Pat. Nos. 6,325,087 and 6,539,967, consists of distribution valve structures incorporating a plurality of fluid outlet ports each of which is provided with a valve seat to receive a hinged valve plate for opening/closing the outlet port. The opening and closing of the respective valve plates results from the contact between a cam follower (or lift pin) that contacts a cam surface mounted on a rotating plate which in turn is driven by the gear reduction mechanism. The cam profile in the prior art is symmetrical such that the opening and closing of the respective valve plates is essentially uniform. The prior art cam is configured to assure that flow occurs through at least three outlet ports as one valve is opened and another is closed. The symmetrical cam is driven in response to an impeller assembly and gear reduction mechanism to sequentially open and close the multiple valve assemblies associated with corresponding outlet ports. The distribution valves described in the referenced patents have been widely used in residential and commercial swimming pool installations for many years and have proven highly reliable. Unexpectedly, the present invention greatly improves the efficiency of the commercially successful prior art valves by means of a cam that has an asymmetric (rather than symmetric) configuration and which allocates outlet flow solely between two adjacent outlet ports (rather than three).

The object of the present invention is to significantly improve the performance and efficiency of prior art distribution valves by disproportionately small modifications in the controlled actuation of the outlet valves. It is another object of the invention to greatly improve the performance of prior art distribution valves without the need for substantial structural modifications or the expenditure of large sums of money for new tooling. Specifically, it is an objective of the invention to significantly increase the effective cleaning area achieved by prior art distribution valves as used in both new and existing swimming pool cleaning applications. It is a further object of the invention to achieve improved cleaning efficiency using prior art distribution valves without increasing (or, alternatively, reducing) the rotational torque and energy required to operate the distribution valve. It is also an objective to enable various cost savings either individually or in combination, including reductions in the spacing and/or number of cleaning heads required in new swimming pools, reduction in the required size of plumbing components and/or the horsepower of the recirculation pump used to achieve otherwise equivalent cleaning in new installations and/or reduction in the power consumption associated with the operation of swimming pools having in-floor cleaning systems.

SUMMARY OF THE INVENTION

Briefly described, and in accordance with one embodiment thereof, the invention provides a distribution valve having a fluid inlet port and a plurality of fluid outlet ports, wherein the distribution valve includes a housing including an inlet (3). The housing includes an upper section (15B) and a lower section (15A). A gear reduction assembly (2) located in the housing includes a gear reduction mechanism (2A) and impeller (2B) located near the inlet port and connected to a rotary input shaft of the gear reduction mechanism (2A). An improved cam device, shown separately in FIG. 11, engages a rotary output shaft of the gear reduction mechanism so as to rotate the cam device in response to rotation of the impeller. The improved, asymmetric cam device (6) includes a cam plate (6D), having a leading cam surface (6B-3), a trailing cam surface (6B-1) and a transitional cam surface (6B-2). This cam mechanism rotates about a central connection point (18) in response to rotation of impeller (2B).

A plurality of valve assemblies disposed in the lower section (15A) of the distribution valve (15) are arranged to open or close fluid paths through the plurality of fluid outlet ports (4), respectively, in response to rotation of the cam surface (6B), including the three principal cam surfaces (6B-1, 6B-2 and 6B-3). Each valve assembly includes a valve seat in the corresponding fluid outlet port, and a hinged valve plate (9) in the lower section (15A) connected to contact the valve seat so as to close the outlet port and to move away from the valve plate to open the outlet port. Each valve assembly also includes a cam follower or lift pin (10) connected to the valve plate (9) for engaging the cam surfaces (6B) to open and close the outlet port as the improved version of the cam (6) rotates. The plurality of outlet ports (4) is concentrically disposed around the cam (6). The improved cam device (6) rotates in response to the impeller assembly and gear reduction assembly to sequentially open and then close sequential pairs of the valve assemblies. In the described embodiments, the asymmetric cam device (6) operates to control the opening and closing of adjacent pairs of valves, with one valve opening while an adjacent valve is closing.

More particularly, the invention is based on an asymmetric cam for use in controlling the flow through a rotating distribution valve having a drive shaft, an input port and a plurality of valve-operated output ports, said cam including:

(a) a cam plate having a center of rotation with a connection to engage the drive shaft of said distribution valve;

(b) a leading cam surface to control the opening of said outlet ports, said leading surface extending circumferentially from said cam plate at an angle between about 46 and 52 degrees;

(c) a trailing cam surface to control the closing of said outlet ports, said trailing surface extending circumferentially from said cam plate at an angle of between about 54 and 66 degrees; and (d) a transitioning cam surface extending between said leading and trailing cam surfaces to selectively maintain the outlet ports in their open position and to allocate flow through two adjacent outlet ports as one port closes and the adjacent port opens.

DESCRIPTION OF THE DRAWINGS

FIGS. 1 through 7 are incorporated from and further described in U.S. Pat. No. 6,539,967.

FIG. 8 is not to scale and is provided to aid in the explanation of the relative locations and paths of lift pins used to selectively open valves in a distribution valve that embodies the present invention.

DETAILED DESCRIPTION OF THE PREFERRED EMBODIMENTS

Figure 1A:
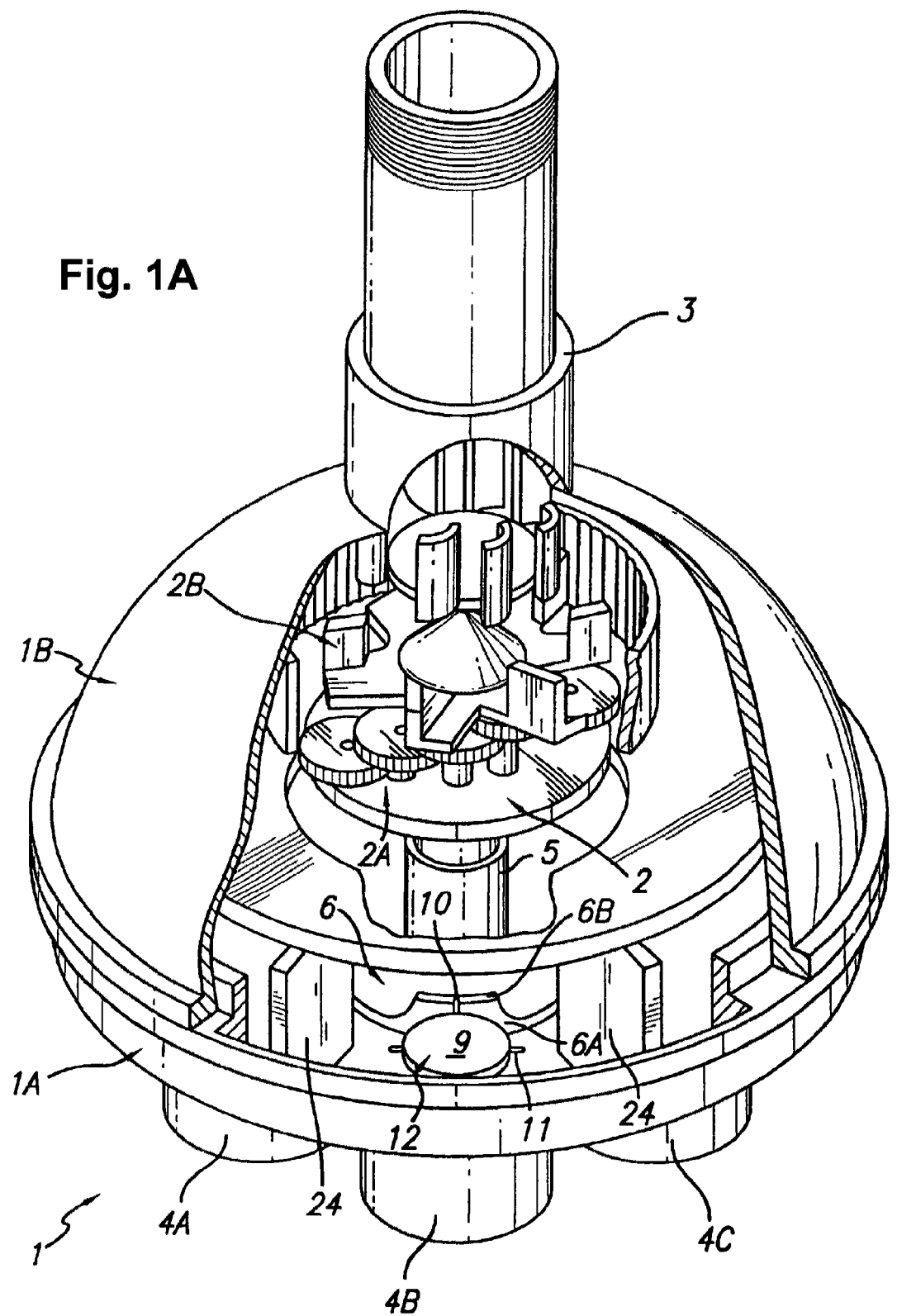
FIG. 1A is a partial cutaway perspective view of one embodiment of a distribution valve that can be adapted for enhanced performance in accord with the present invention.
Figure 2:
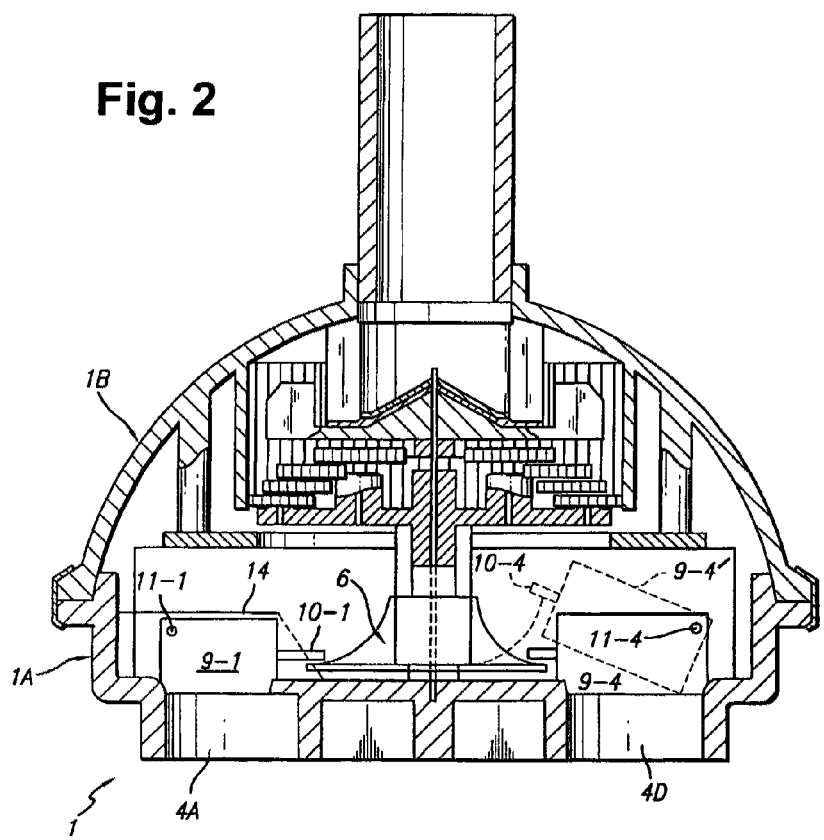
FIG. 2 is a partial section view of the embodiment shown in FIG. 1A.

FIGS. 1A and 2 show one embodiment of the invention which includes a distribution valve 1 having a lower section 1A and a separable upper section 1B that is clamped in sealed relationship to lower section 1A. Upper section 1B includes an inlet port 3 as shown. Lower section 1A includes a plurality of concentrically arranged outlet ports 4, in this embodiment there are six outlet ports 4A through 4F. These outlet ports are sometimes collectively referred to only by reference numeral 4. A gear reduction assembly 2 within distribution valve 1 includes a gear reduction mechanism 2A having an input shaft driven by an impeller 2B. The gear reduction assembly 2 can be essentially as described in any of the prior distribution valve patents incorporated by reference above. The gear reduction mechanism 2A includes a downward-extending output shaft 5 that is connected to a cam device 6. An improved cam device 6 includes a raised peripheral section 6A having a cam surface 6B. As cam device 6 rotates, cam surface 6B operates to sequentially open and close the plurality of valve assemblies 12, one of which is disposed in the fluid path through each of outlet ports 4A through 4F. The improved cam 6 (best shown in FIG. 11) can be configured to fit into and function within distribution valve 1 as a replacement for the cam device used in the prior art distribution valves. As noted in relation to FIGS. 6, 7, 12 and 13, a commercially available 5-port version of the valve 1 shown in FIG. 1A can also be adapted for enhanced performance though incorporation of the improved cam shown in FIG. 13.

In terms of general valve operation, each of valve assemblies 12 includes a valve plate 9 having a flat bottom surface that precisely rests on and seals against a valve seat surrounding the fluid passage through the associated outlet port 4. Each valve plate 9 is pivotally connected by a pivot pin 11 to a boss 21 (not shown in FIG. 1A) so that valve plate 9 can be raised by cam surface 6B to open the valve and thereby allow swimming pool water to flow from inlet port 3 through the distribution valve and out of the corresponding outlet port 4.

The hinged structure allows the valve plate 9 to be raised by the cam surface 6B as the cam device 6 rotates, so as to open the valve assembly 12 of outlet port 4 and allow the swimming pool water forced into inlet port 3 to pass through distribution valve 1A and be forced out of the open outlet port 4. The hinged structure also allows the valve plate 9 to be lowered by cam 6 onto the valve seat to close the valve and thereby prevent the swimming pool water from flowing out of the corresponding outlet port. Dotted line 9-4' in FIG. 2 shows the raised configuration of valve plate 9-4 while its lift pin 10-4 is supported on subsequently described cam surface section 6B-2. See FIGS. 4 and 8-11. When closed, the valve plates 9 rest on and completely seal against the valve seats of their corresponding outlet ports 4. Numeral 14 in FIG. 2 designates a boss or structure in which the hinge pins 11 are journaled.

Figure 1B:
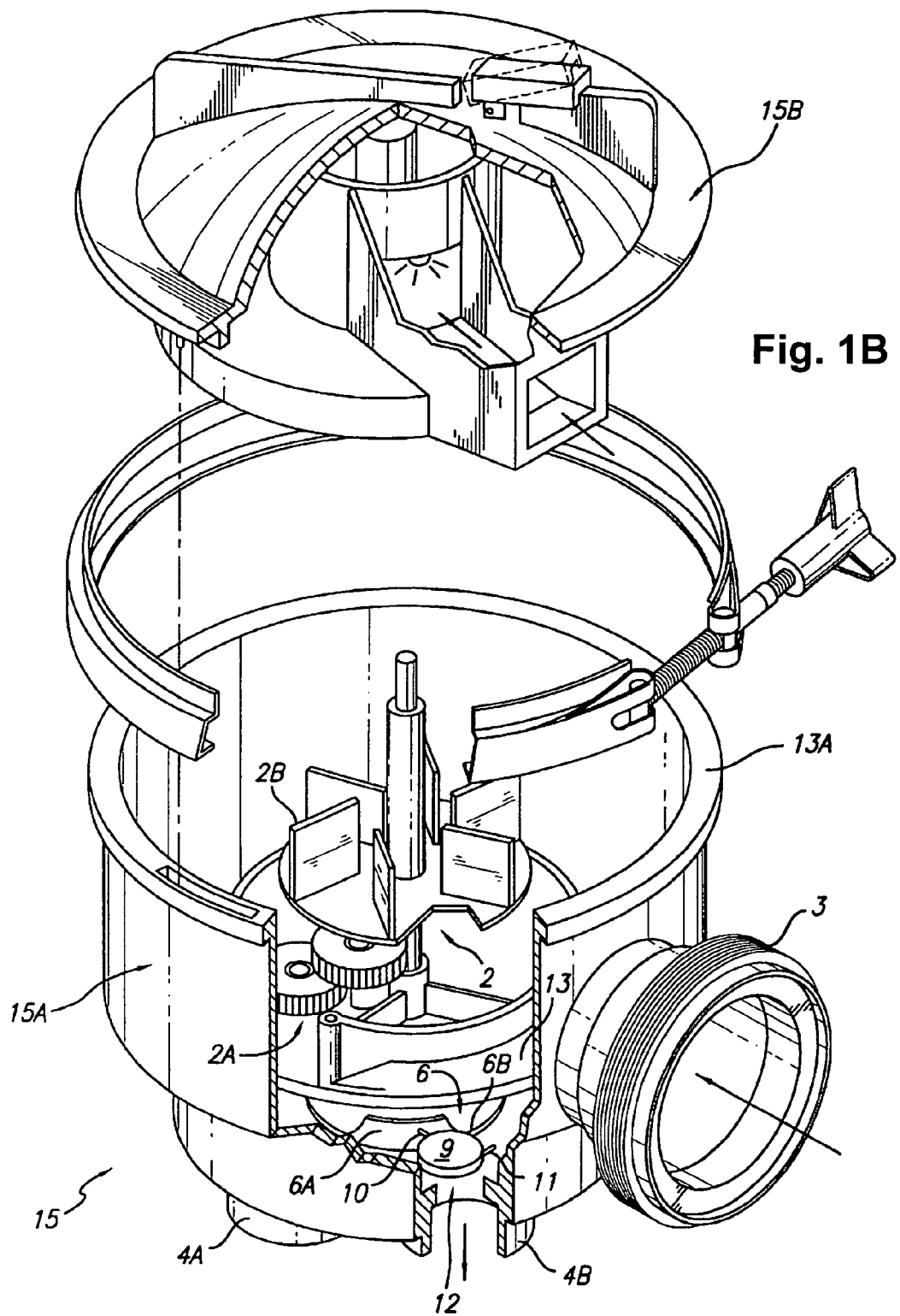
FIG. 1B is a partial exploded, cutaway perspective view of a second embodiment of a distribution valve that can be adapted for enhanced performance in accord with the present invention.

Referring to FIG. 1B, another form of distribution valve 15 includes a lower section 15A and an upper section 15B. The general structures of sections 15A and 15B, except for the valve assemblies, are described in the previously incorporated U.S. Pat. No. 6,189,556, by Blake et al., issued Feb. 20, 2001, entitled "Low Profile, Low Resistance Distribution Valve And Method For Swimming Pools". Distribution valve 15 of FIG. 1B differs structurally from distribution valve 1 of FIG. 1A in that, for example, inlet port 3 in FIG. 1A is provided in upper section 1B, whereas in FIG. 1B, the inlet port 3 is provided in lower section 15A.

Figure 3:
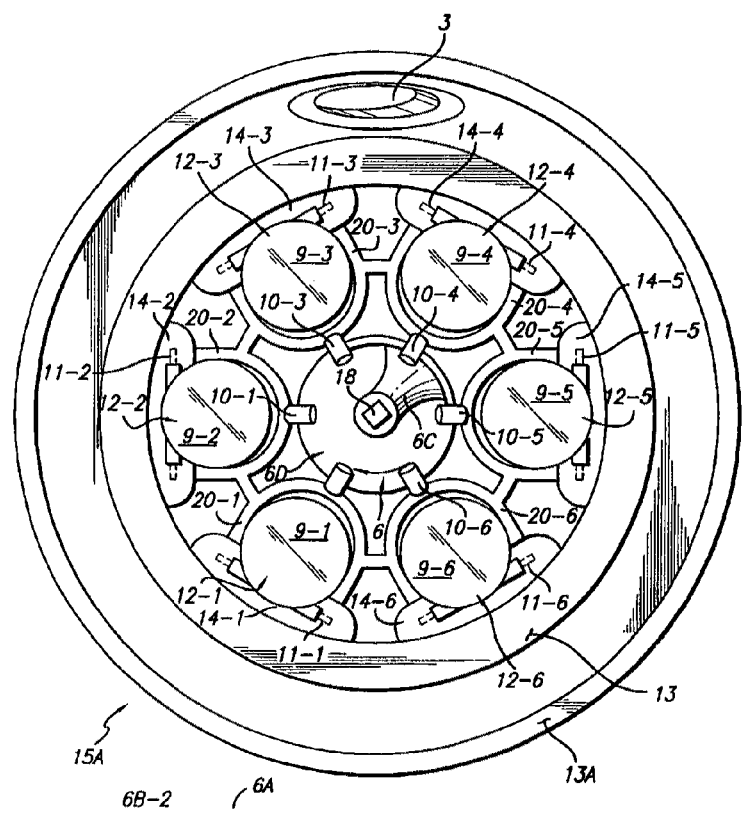
FIG. 3 is a partial top perspective view of the lower section 15A of FIG. 1B, showing the general spatial relation of prior art cam 6 to the lift pins 10 that cause valves 12 to pivot between their closed and open positions.

In FIG. 3 the upper section 15B of the distribution valve 15 shown in FIG. 1B has been removed to show a top view of the lower section 15A of the distribution valve 15. The valve assemblies 12-1 through 12-6 are shown in a circular array around the prior art cam device 6. When this prior art cam device 6 is replaced by the improved cam illustrated and described in relation to FIGS. 8 through 11, the performance of the valve 15 is greatly improved, as demonstrated in part by the comparative test data included in FIGS. 14 through 16.

Figure 4:
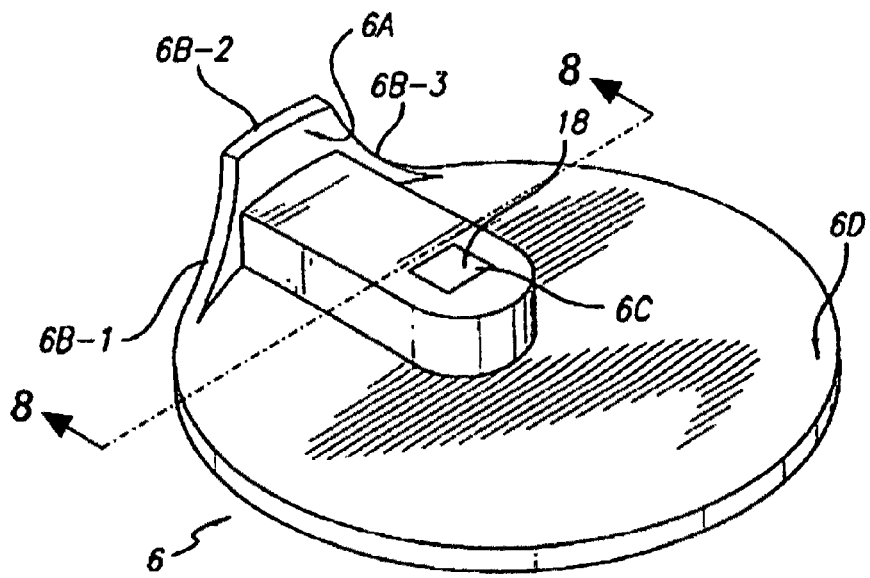
FIG. 4 is a generalized perspective view of a cam 6 such as shown in FIG. 1A, FIG. 1B and FIG. 3 and modified versions thereof as illustrated and discussed in relation to FIGS. 8 through 16.

A generalized perspective view of a cam 6 is shown in FIG. 4. This generalized cam includes cam plate 6D having an integral circumferential raised element 6A and an integral raised section 6C on the upper surface of the plate 6D. The cam surface 6B includes sections 6B-1, 6B-2 and 6B-3. The lift pins 10 of the various valve plates 9 ride up on cam surface 6B to control the opening and closing of the various valve assemblies 12 as cam 6 rotates in relation to the pins 10. A square hole 18 in inner raised section 6C is located at the center of rotation and detachably connects to a corresponding square portion of drive shaft 5, which, in turn, is connected to the output shaft of gear reduction mechanism 2A.

Figure 5:
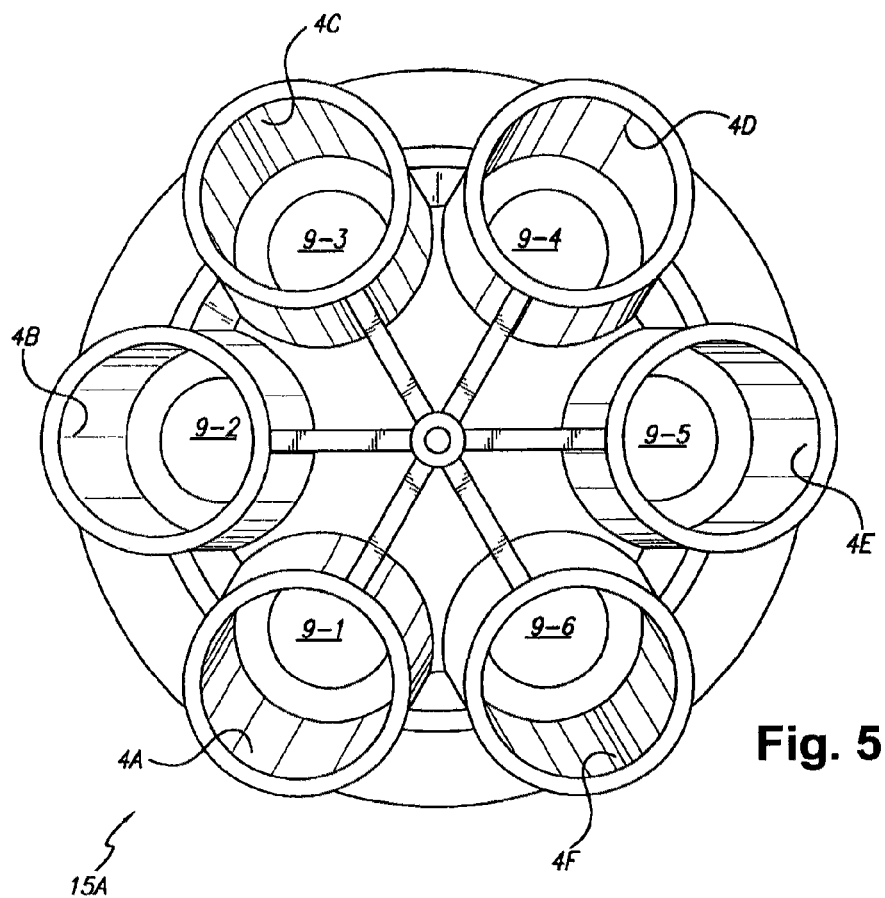
FIG. 5 is a bottom perspective view of the lower section 15A shown in FIG. 1B.

FIG. 5 shows a perspective view of the bottom of lower section 15A of distribution valve 15 of FIG. 1B. By way of example, in reference to FIG. 5, if valve plates 9-4 and 9-5 both are partially open, this would indicate that one of them is at the last stage of being closed and the other is at the beginning stage of being opened. The remaining valve plates 9 in FIG. 5 would then be completely closed and sealed against their respective valve seats.

Figure 6:
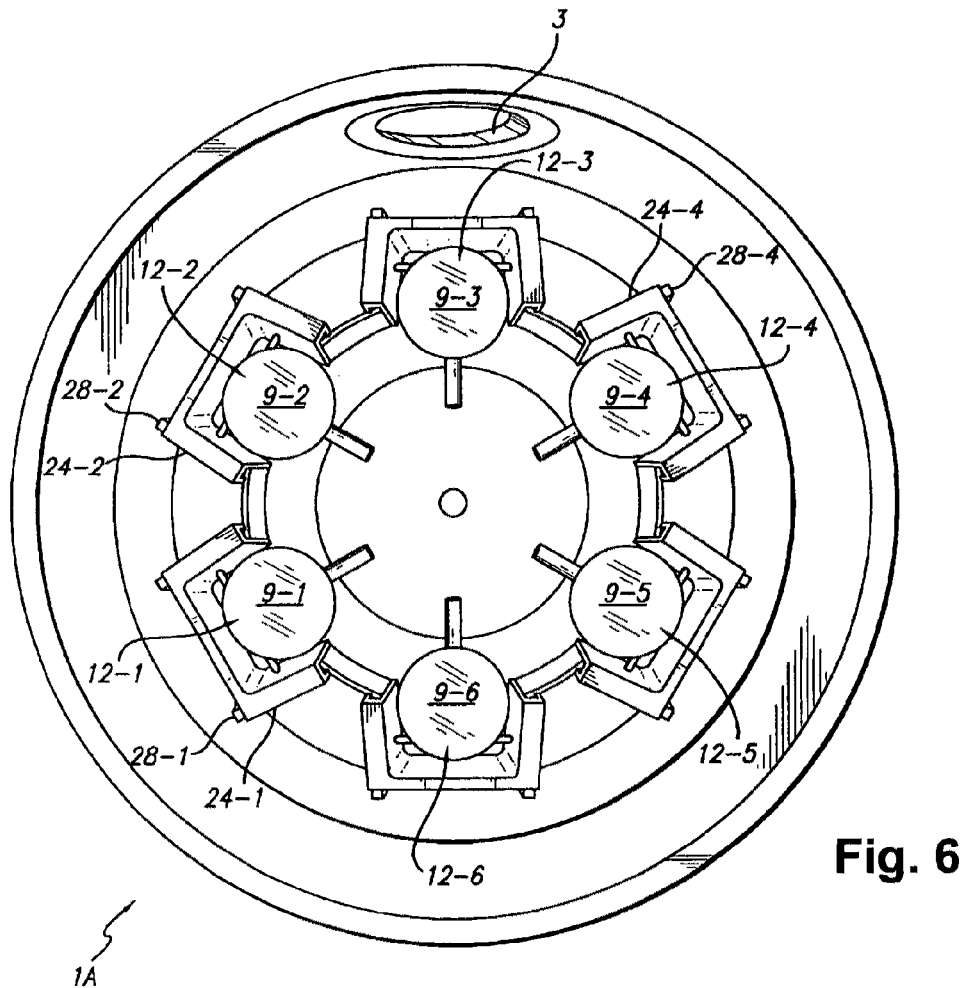
FIG. 6 is a partial top perspective view of the lower section 15A shown in FIG. 1B.
Figure 7:
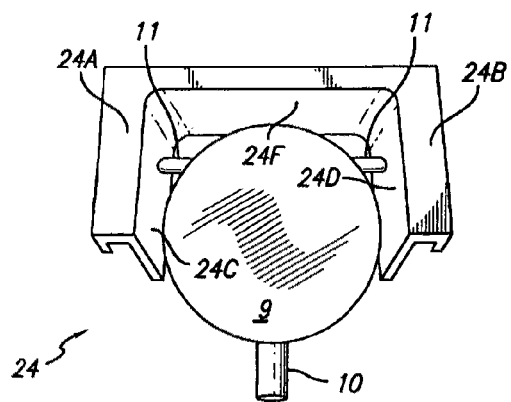
FIG. 7 is a top perspective view of a single valve assembly 24 shown in FIG. 6.

FIG. 6 shows a perspective top view of lower section 15A of distribution valve 15 of FIG. 1B, wherein six valve assemblies 24-1, 2 . . . 6 are snapped on to the elevated ridges 28-1, 2 . . . 6 as shown. FIG. 7 shows the details of a single valve assembly 24, wherein valve plate 9, with lift pin 10 extending radially. Valve plate 9 is connected by hinge pin 10 to a clip-on frame including a U-shaped wall having opposed side walls 24C and 24D connected in perpendicular relationship to a back plate 24F as shown. Clip-on flanges 24A and 24B are attached to and integral with the upper edges of side walls 24C and 24D, as shown. If necessary, the undersides of flanges 24A and 24B can be attached by a drop of glue to the elevated ridges 28-1 etc. As further described in U.S. Pat. No. 6,539,967, valves of this type can be retrofitted in prior art distribution valves that use spherical acrylic valve balls as valve closures while providing the additional advantage of requiring less torque on the gear reduction mechanism 2A, with corresponding reduction in maintenance costs. With this modification of the valve structures, these prior art ball valves can be retrofitted with the cam of the present invention to achieve substantially enhanced performance and efficiency.

Figure 8:
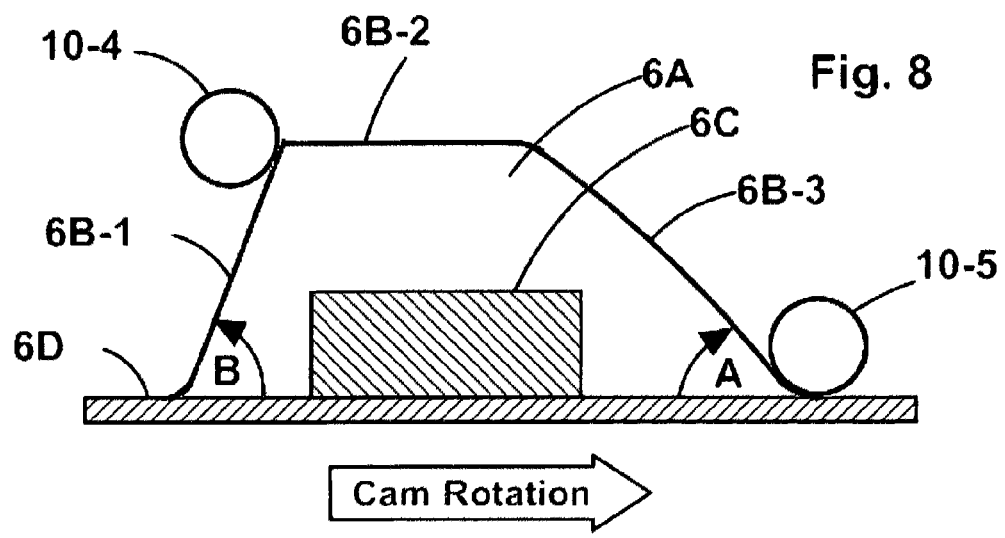
FIG. 8 is a generalized schematic profile of a cam constructed in accordance with the teachings of the present invention, as viewed at Section 8-8 in FIG. 4.
Figure 9:
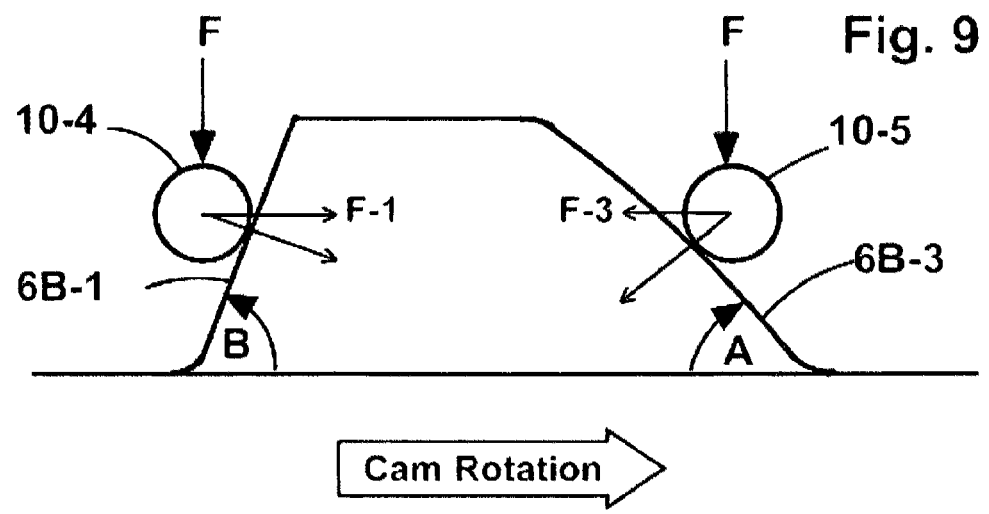
FIG. 9 is a simplified version of FIG. 8 modified to illustrate the counteracting forces exerted on the cam by adjacent pairs of lift pins as one valve opens and an adjacent valve closes.
Figure 10:
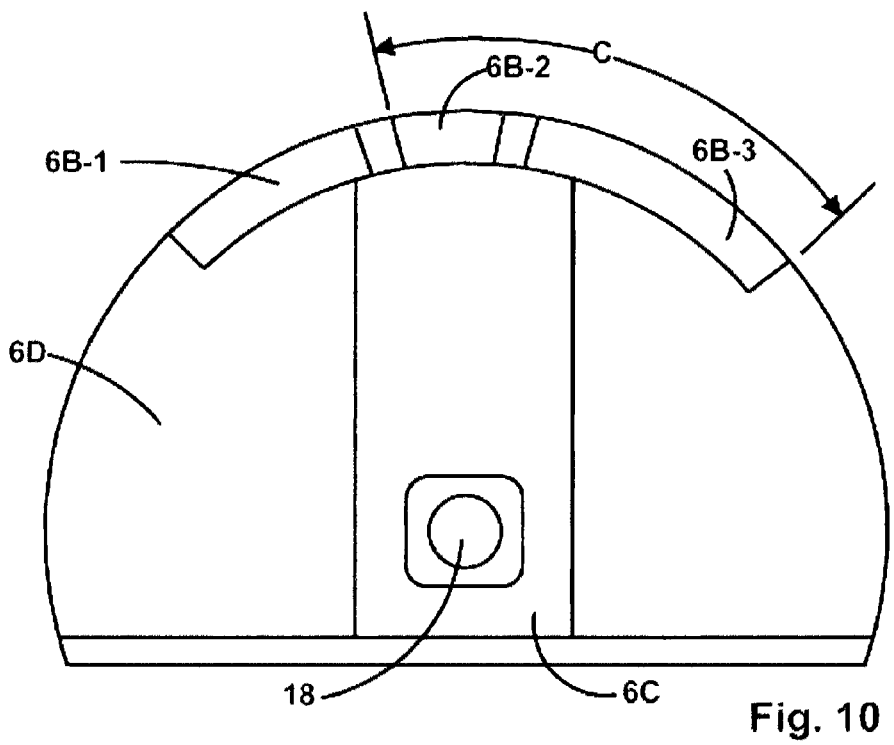
FIG. 10 is a top view of the cam shown in FIG. 11, which represents one embodiment of the present invention that has been used to enhance the performance of distribution valves of the type shown in FIGS. 1A and 1B.
Figure 11:
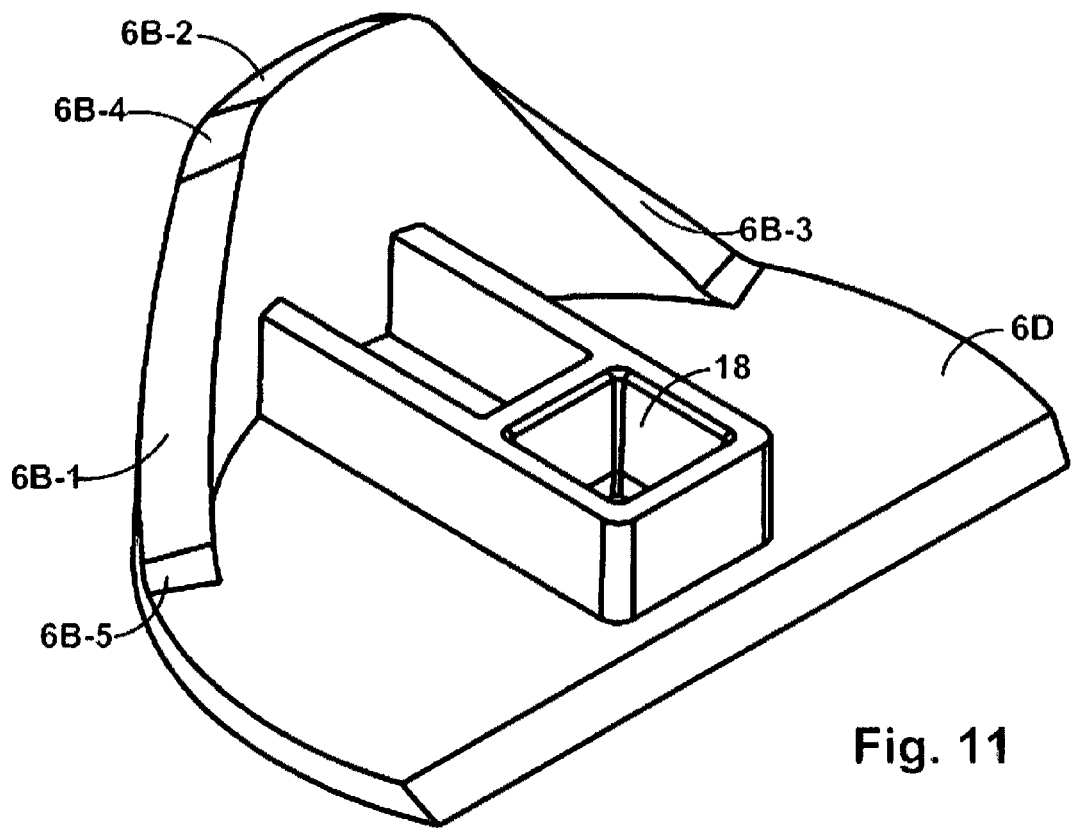
FIG. 11 is a scaled perspective view of a cam that embodies the present invention and is used to significantly enhance the performance of the distribution valves such as those shown in FIG. 1A and FIG. 1B.

FIGS. 8 and 9 show schematic views of a cam 6 that embodies the present invention. These schematic views are representative of what would be seen at Section 8-8 in FIG. 4. FIGS. 8 and 9 are not to scale, but are intended to visually emphasize the spatial relation between two adjacent lift pins 10-4 and 10-5 and the asymmetric nature of the cam 6 as defined by the angle A of the leading cam surface 6B-3 and the opposing angle B of the trailing cam surface 6B-1. FIG. 11 is a true scale perspective view of one embodiment of the invention. FIG. 11 is derived from a CAD drawing of an actual manufactured component. FIG. 10 is a simplified top plan view of the cam 6 shown in FIG. 10.

Cam surface 6B includes a transition section 6B-2 that runs between the two asymmetrical and opposed inclined cam surfaces 6B-1 and 6B-3. In this embodiment, the cam 6 rotates clockwise as viewed in FIG. 4 and the relative movement of the cam is from left to right when viewed in the schematic drawings of FIGS. 8 and 9 (as indicated by the directional arrow at the bottom of each drawing). As the cam 6 advances, each lift pin 10 rides up the leading cam surface 6B-3 so as to open the corresponding valve 12. As the cam 6 further advances, the pin is held in its highest position by transitional surface 6B-2. This holds the corresponding valve 12 in its fully open position. As the cam 6 further advances, the lift pin 10 engages the end of the transition cam surface 6B-2 followed by the trailing cam surface 6B-1. This lowering of pin 10 along trailing cam surface 6B-1 results in the closing of the corresponding valve 12.

The length of the transitional cam surface 6B-2 is set to a length that separates the leading and trailing cam surfaces 6B-3 and 6B-1 by a distance that assures that, as the one valve is closing, the next adjacent valve is beginning to open. This sequencing assures that there is never a time when both adjacent valves are completely closed, which would produce an undesirable "spike" in the back pressure inside the distribution valve. This sequencing also avoids the prior art inefficiency associated with having periods when flow is allocated among three (rather than just two) of the outlet ports 4. Thus, as shown in FIG. 8, the valve associated with lift pin 10-5 is initiating its accent up the leading cam surface 6B-3 as the adjacent lift pin 10-4 is initiating its descent down the trailing cam surface 6B-1. At no time during this transition are any of the other lift pins engaged by the cam 6.

The directly related prior art teaches the use of symmetrical cam profiles, where the leading and trailing cam surfaces form the same (opposed) angles with respect to the cam plate. Contrary to this long established practice, the present invention discloses surprising advantages resulting from a predetermined asymmetry in the leading and trailing cam surfaces 6B-3 and 6B-1. It has been found that improved cleaning effectiveness and efficiency is achieved by providing a trailing cam surface (6B-1) that is at a steeper-angle B with respect to the cam plate 6D than the opposing angle A of the leading cam surface (6B-3). The leading cam surface must be at a sufficiently low angle A to provide the necessary mechanical advantage required to lift the corresponding pin 10 from its closed to its open position. The force required to open the lift pin 10 is a function of the water pressure acting on the surface of the closed valve. With higher pressure, more force will be required to lift pin 10. The force required to lift pin 10 defines the maximum angle of inclination (A) of the leading cam surface. Any angle greater than this maximum angle will result in the distribution valve stalling, because the valve train will be unable to develop sufficient torque to lift the corresponding pin 10.

As shown in the schematic view of FIG. 9, the forces F acting on the pair of adjacent pins 10-4 and 10-5 are equal, because the geometry of the corresponding valves 12 are identical. When the trailing surface 6B-1 has a greater included angle B than the included angle A of the leading surface 6B-3, the opposing circumferential force F-1 will always exceed the opposing force component F-3. Rotational advancement of the cam 6 is aided by the amount force component F-1 exceeds force component F-3. In the preferred embodiment of the invention where angle B is about 56 degrees and angle A is about 48 degrees, the relative magnitude of the two opposing forces F-1 and F-3 is proportionate to the cosines of the two angles' respective complements. Thus, in the preferred embodiment, force component F-1 is about 12% greater than force component F-3 and this greater opposing force supplements the rotational force imparted by the drive shaft and lessens the torque across the gear train that drives the cam 6. This reduction in torque translates to less wear over time. In other words, this supplemental force applied to the cam, and thus to the entire drive assembly, decreases the amount of force needed to be supplied solely by the gear reduction mechanism to the opening of the succeeding valve.

The improved cam of the present invention also results in each valve closing more rapidly than it opens. This occurs because of the steeper slope of the angle B as compared to the Angle A. In some circumstances this differential rate may extend the time that the valves operate at a desired operating pressure. That is, if the pressure available at the opening valve has a tendency to fall because of the momentary increase in volume of Water flowing through two valves being open (rather than just one), the more rapid closure of one valve will permit the pressure to more rapidly return to the desired operating pressure associated with flow through a single outlet port.

As a matter of valve design, any supplemental force resulting from force component F-1 being greater than F-3 can be traded off to allow a steeper angle A for the leading cam surface 6B-3. The synergy of the asymmetrical cam surfaces results in an increase in the effective length of the transitional cam surface 6B-2 which increases cleaning effectiveness and efficiency by increasing dwell time during which each set of cleaning heads is exposed to an effective cleaning pressure of a predetermined operating value.

It has been found that an operating pressure of about 8 psi or more is suitable to produce an effective jet of water from the cleaning heads. Further, it is known that for a given pressure, the longer a jet is held at that pressure, the further the emitted jet will propagate into a liquid body until a maximum effective penetration distance is reached. In the case of pop-up cleaning heads used in swimming pools, the emitted jet will reach further and with greater effectiveness if the dwell time is increased (dwell time being time that the jet operates at design pressure). Thus, increasing the dwell time results in an increased cleaning radius that translates into a greater cleaning area.

The asymmetric relationship between the leading and trailing cam surfaces provides significant and unexpected increases in effective cleaning performance; the asymmetric relationship has been found to provide those advantages when the leading cam surface angle A is in the range from about 46 degrees to 52 degrees and the trailing cam surface angle B is in the range of about 66 degrees to 54 degrees. The preferred angles in these ranges are about 48 (48.5) degrees for the leading cam surface 6B-3 and 56 (56.5) degrees for the trailing cam surface 6B-1. These asymmetrical angles produce materially different results as compared with prior art cams that have equal cam angles of about 42 (42.5) degrees.

Again referring to FIG. 8, lift pin 10-5 is contacting the leading cam surface 6B-3 and is beginning its journey up the cam surface to open the corresponding valve. While this valve is being opened, the lift pin 10-4 is following the cam profile of the trailing cam surface 6B-1 to close the valve attached to the lift pin 10-4. Since the angles A and B are different, and since the latter is steeper than the former; the valve controlled by the lift pin 10-4 closes more rapidly than the valve controlled by pin 10-5 opens. Thus, the time required to close the valve attached to pin 10-4 is less than the time required to open the valve attached to pin 10-5. As previously noted, having shorter closing time contributes to the complex of synergistic factors that enhance the efficiency of prior art distribution valves.

Figures 14, 15, 16:
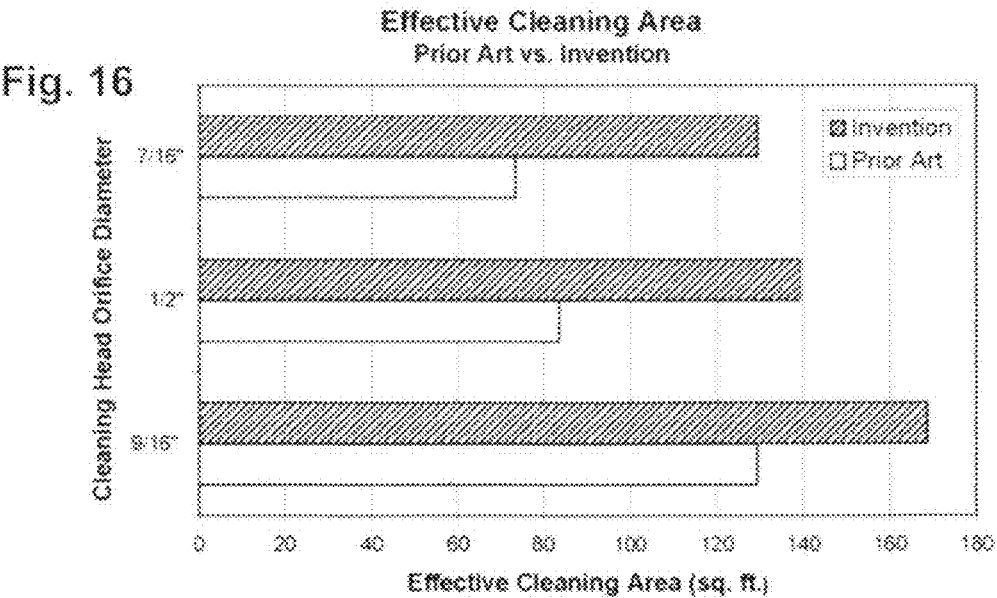
FIG. 14 is a table comparing the measured performance of a distribution valve of the type shown in FIG. 1A and the measured performance of the same valve after its prior art cam was replaced with a cam embodying the present invention (as shown in FIG. 11).
FIG. 15 is a table comparing the effective cleaning radius and cleaning area produced by cleaning heads driven by a prior art distribution valve of the type shown in FIG. 1B and the same values produced by the same distribution after its prior art cam was replaced with a cam embodying the present invention (as shown in FIG. 11).
FIG. 16 is a family of bar charts that visually represent the comparative cleaning area data contained in the table of FIG. 15.

To demonstrate the enhanced performance achieved by the cam of the present invention, a test was performed on an existing swimming pool having an in-floor cleaning system actuated by a distribution valve of the type shown in FIGS. 1A and 2. Each of the six output ports of this valve were plumbed to multiple pop-up cleaning heads that, when actuated, rise up from the surface of the pool and direct jets of water along the surface. FIG. 14 shows the results of testing run on this swimming pool; first, operating with the existing distribution valve of FIGS. 1A and 2; and then, operating the same distribution valve modified by the substitution of the improved cam of the present invention for the prior art cam. No other changes were made to the system. For the purpose of this comparative test, a pressure gauge was installed at the inlet 3 of valve 1 as shown in FIG. 2. This pressure gauge was used to detect when water was flowing through the six outlet ports at a peak pressure. The pump motor was allowed to operate and the duration of the peak pressure was timed as the valve progressed through each of its six outlet ports. The time in seconds for peak pressure through each of the cleaning zones was recorded. The recorded time provided a measure of how long the corresponding outlet valve 12 was open and flowing at peak pressure. Any increase in this time corresponds to enhanced valve efficiency and enhanced cleaning of the pool surfaces, due to increased dwell time. As shown in the table of FIG. 14, operating the same distribution valve with the improved cam of the present invention produced, on average, an increase of some 280% in cleaning time at peak pressure. This wholly non-obvious improvement in performance was achieved in a distribution valve that has been the subject of ongoing research, development and improvement for nearly 30 years. Further, this highly significant improvement was achieved with a modest and inexpensive change to a long established, commercial product that is marketed in a field that is characterized by competition for technical supremacy.

In a second comparative test, the effective cleaning radius and area associated with a distribution valve of the type shown in FIGS. 1B and 3 was evaluated; first, by using the prior art cam provided with such valves over the preceding decade; and then, by substituting a cam of the type shown in FIG. 11. As shown in the table of FIG. 15, this comparative test was performed using cleaning heads having outlet orifices of different diameters within the most typical range of diameters. In all cases these cleaning heads were operated at the same pressure of 8 psi. In the most frequently used jet diameter (7/16"), the effective cleaning area achieved by the valve when operated with the improved cam of the present invention was some 76% greater than the effective cleaning area achieved when the identical valve was operated at the same pressure with its prior art cam. The chart of FIG. 16 provides a visual representation of the data in the table of FIG. 15.

Thus, when the respective cleaning heads are operating at or above the design pressure for a greater length of time, cleaning effectiveness is greatly increased by effectively extending the reach of the water jets emanating from the cleaning heads. This translates into a material increase in the effective cleaning area for each cleaning head. This increased cleaning area allows for the design of new swimming pools with fewer cleaning heads with an associated reduction in the cost of construction.

Another possible advantage resulting from the synergistic effects of the improved cam is the potential for significant energy savings. If substituting the distribution valve of the present invention for an existing prior art distribution valve increases the effectiveness of the surface cleaning as described above, this could allow for a reduction in the run time with an associated savings in utility costs. Since a complex of interrelated requirements must be met for this occur, it is not expected that energy savings can be achieved without further research, development, testing and analysis of the various mechanisms involved in the cleaning process. In general, since the individual cleaning heads become more effective in surface cleaning when the cam of the present invention is introduced, a substantial reduction in cleaning time could be achieved without a reduction to the pre-existing level of cleaning effectiveness. Such a trade off between increased cleaning efficiency and reduced cleaning time may result in a substantial savings in the energy required to operate a swimming pool that incorporates one of the many prior art distribution valves.

Referring to the pins 10-4 and 10-5 illustrated in FIG. 8, it is noted that the angular displacement of these pins will depend on the number of outlet ports incorporated into the distribution valve. In the case of six-port valves such as those illustrated and described in relation to FIGS. 1A and 2A, the pins 10 will be displaced from one another by 60 degrees. In the case of a five-port valve this angular displacement would be 72 degrees and in the case of a four-port valve the pins would be displaced by 90 degrees.

In cams made in accord with the present invention, it has been found that good performance can be achieved by having the circumferential lengths of the leading cam surface 6B-3 plus the circumferential length of the transition cam surface 6B-2 extend over the angle of separation between two adjacent pins 10. This is best illustrated in FIG. 10, which is a simplified top plan view of the improved cam shown in FIG. 11, which is used to enhance the performance of six-port valves of the type shown in FIGS. 1A and 1B. As illustrated in FIG. 10, the circumferential lengths of the leading cam surface 6B-3 and the transition cam surface 6B-2 are included within the angle C, which in this case is 60 degrees. In a cam designed for use in a five-port distribution valve, the angle C would be 72 degrees and the lengths of the leading and transition cam surfaces would vary accordingly, while the preferred angles associated with the leading and trailing cam surfaces (angles A and B in FIGS. 8 and 9) would remain the same as used in the six-port configuration.

Figure 12:
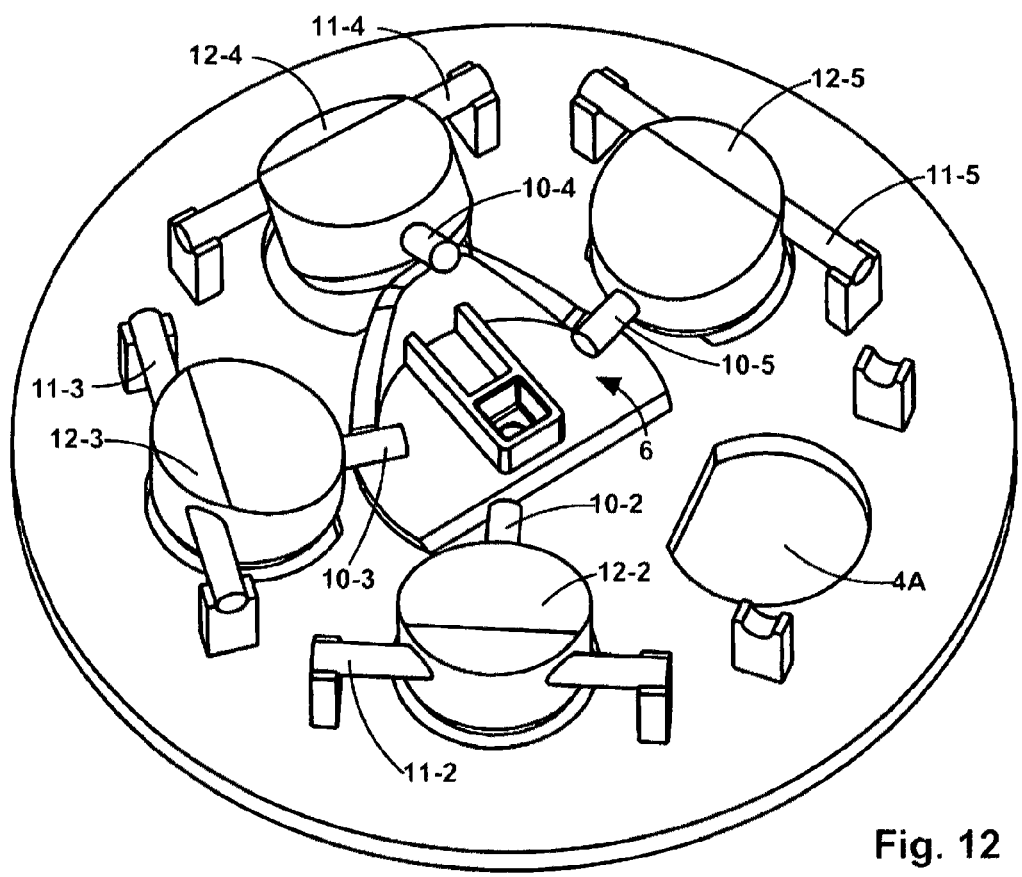
FIG. 12 is a simplified view of a lower valve plate in a distribution valve of the type shown in both FIG. 1A and FIG. 1B but having five, rather than six, outlet ports.
Figure 13:
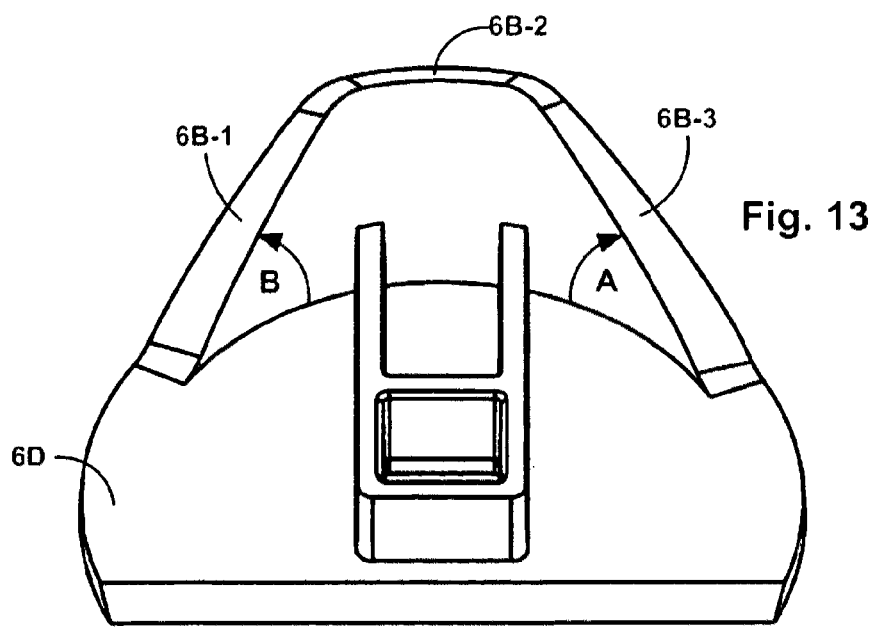
FIG. 13 is a scaled perspective view of a cam that embodies the present invention and is designed to significantly enhance the performance of 5-port version of the valve 1 shown in FIG. 1A as further depicted in the partial perspective view of FIG. 12.

FIG. 12 provides a generalized illustration of the valve components included in a five-port distribution valve, with the same reference numerals applied to functionally identical parts. The six-port valve shown in FIGS. 1A and 2 has also been commercially available for many years in a five-port version. In the simplified perspective view of FIG. 12, the valve mechanism (12-1) that would control the flow through outlet port 4A has been removed. The cam 6 shown in FIG. 12 is illustrated in detail in FIG. 13. The opposing angles A and B associated with the leading (6B-3) and trailing (6B-1) cam surfaces are in the same ranges as those associated with the six-port version discussed in reference to FIGS. 8 through 11 and the preferred angles are the same, about 48 degrees for angle A and about 56 degrees for angle B. In the preferred embodiments, the cam of the present invention has been injection molded from thermo-plastic that is equivalent to DuPont's Delrin® brand of polyoxymethylene. Finally, as shown in FIGS. 11, 12 and 13, the cam surfaces 6B-1, 6B-2 and 6B-3 are actually multi-axis surfaces that maintain axial contact with the pins 10 in their various pivoted positions between open and closed. This axial contact distributes the pin forces over the width of the cam surfaces and provides smooth operation while minimizing wear over time.

While the invention has been described with reference to several particular embodiments thereof, those skilled in the art will be able to make the various modifications to the described embodiments of the invention without departing from the true spirit and scope of the invention. It is intended that all elements that are insubstantially different or perform substantially the same function in substantially the same way to achieve the same result as what is claimed are within the scope of the invention.

The invention claimed is:

1. In a distribution valve having a drive shaft, an input port and a plurality of valve-operated output ports that are selectively opened to allow fluid flow from said input port, wherein the improvement comprises a cam for controlling the fluid flow through adjacent pairs of said output ports, said cam including:
   (a) a cam plate having a center of rotation connected to the drive shaft of said distribution valve;
   (b) a leading cam surface to control the opening of said outlet ports, said leading cam surface extending circumferentially from said cam plate at an included angle between about 46 and 52 degrees;
   (c) a trailing cam surface to control the closing of said outlet ports, said trailing cam surface extending circumferentially from said cam plate at an angle of between about 54 and 66 degrees; and
   (d) a transitioning cam surface extending between said leading and trailing cam surfaces to selectively maintain the outlet ports in their open position and to allocate flow through two adjacent outlet ports as one port closes and the adjacent port opens.

2. The distribution valve of claim 1 wherein the angle formed by the leading cam surface is about 48 degrees and the angle formed by the trailing cam surface is about 56 degrees.

3. The distribution valve of claim 2 wherein forces exerted on said leading and trailing cam surfaces include opposite circumferential force vectors and wherein the circumferential force vector exerted on the trailing surface exceeds the opposite circumferential force vector exerted on the leading surface.

4. The distribution valve of claim 3 for use in a distribution valve having more than three and fewer than seven outlet ports.

5. A cam for use in controlling the flow through a rotating distribution valve having a drive shaft, an input port and a plurality of valve-operated output ports, said cam comprising in combination:
   (a) a cam plate having a center of rotation with a connection to engage the drive shaft of said distribution valve;
   (b) a leading cam surface to control the opening of said outlet ports, said leading cam surface extending circumferentially from said cam plate at an angle between about 46 and 52 degrees;
   (c) a trailing cam surface to control the closing of said outlet ports, said trailing cam surface extending circumferentially from said cam plate at an angle of between about 54 and 66 degrees; and
   (d) a transitioning cam surface extending between said leading and trailing cam surfaces to selectively maintain the outlet ports in their open position and to allocate flow through two adjacent outlet ports as one port closes and the adjacent port opens.

6. The cam of claim 5 wherein the leading cam surface extends at an angle of about 48 degrees and the trailing cam surface extends at an angle of about 56 degrees with respect to said cam plate.

7. The cam of claim 6 for use in a distribution valve having more than three and fewer than seven outlet ports.

* * * * *